SAXBY & FARMER.
Railroad-Switch Signal.

No. 80,878.

3 Sheets—Sheet 1.

Patented Aug. 11, 1868.

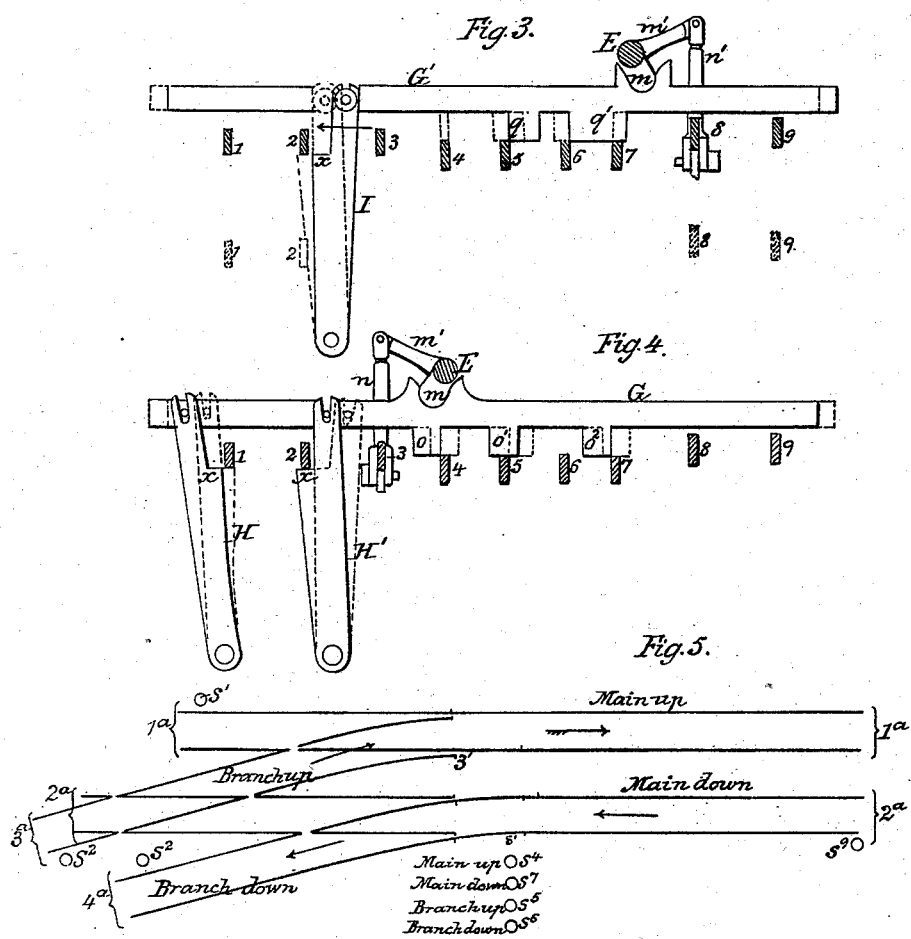

SAXBY & FARMER.
Railroad-Switch Signal.
No. 80,878.
3 Sheets—Sheet 3.
Patented Aug. 11, 1868.
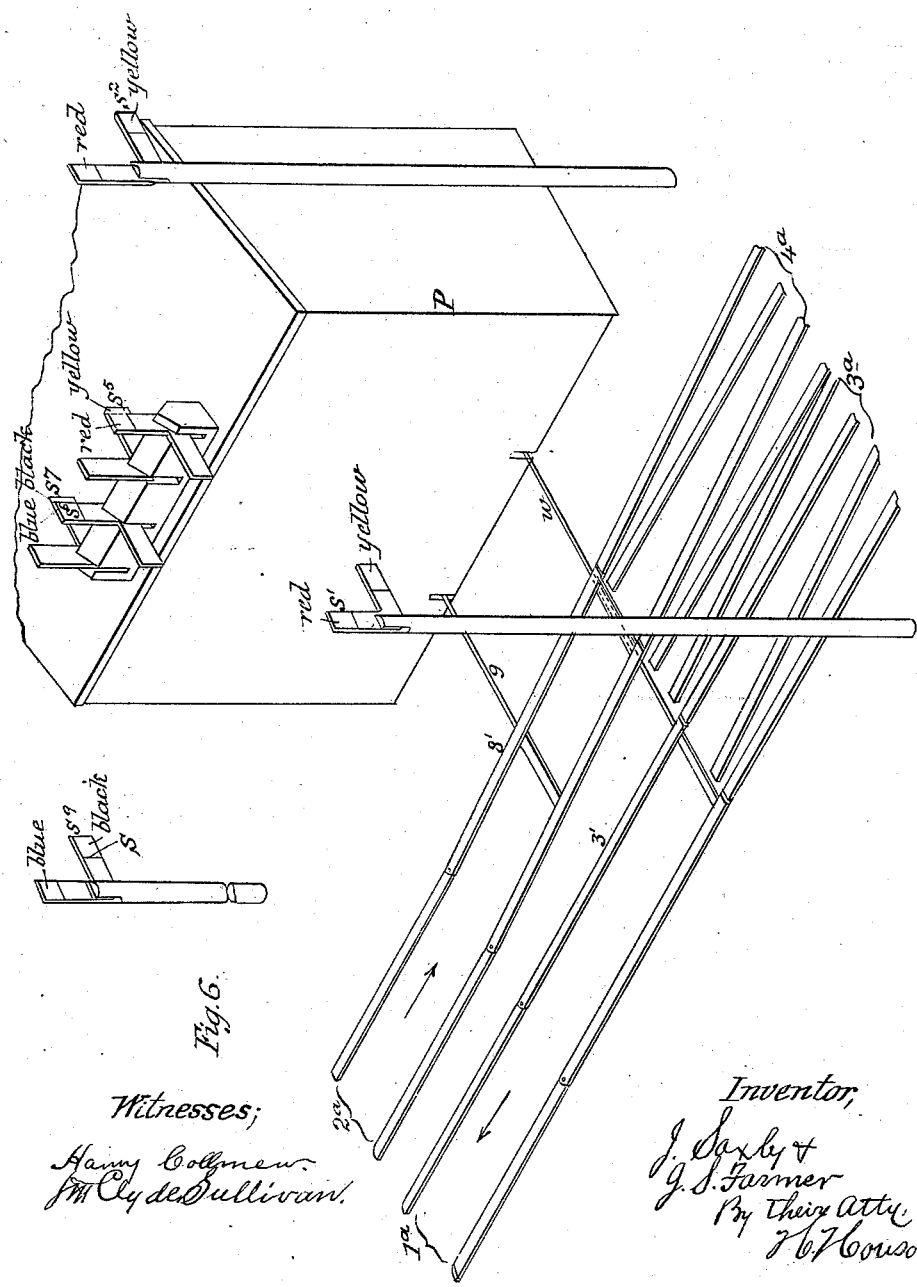

UNITED STATES PATENT OFFICE.

JOHN SAXBY AND JOHN S. FARMER, OF KILBURN, ENGLAND.

IMPROVED SWITCH AND SIGNAL.

Specification forming part of Letters Patent No. 80,878, dated August 11, 1868.

*To all whom it may concern:*

Be it known that we, JOHN SAXBY and JOHN STINSON FARMER, of Kilburn, England, Kingdom of Great Britain and Ireland, have invented an Improved Apparatus for Working, Governing, and Controlling Railway Signals and Switches; and we do hereby declare the following to be a full, clear, and exact description of the same.

Our invention consists of a series of levers, or their equivalents, which are connected to and operate the signals and switches of a railway-junction, in combination with devices so constructed, arranged, and operating that, after a change in the position of one or more of the switches, the levers connected to the signals or switches which are properly arranged are locked in their positions, while the levers connected to the signals or switches which require adjustment may be operated to effect this adjustment.

In order to enable others skilled in the art to make and use our invention we will now proceed to describe its construction and operation, reference being had to the accompanying drawings, which form a part of this specification, and in which—

Figure 1:
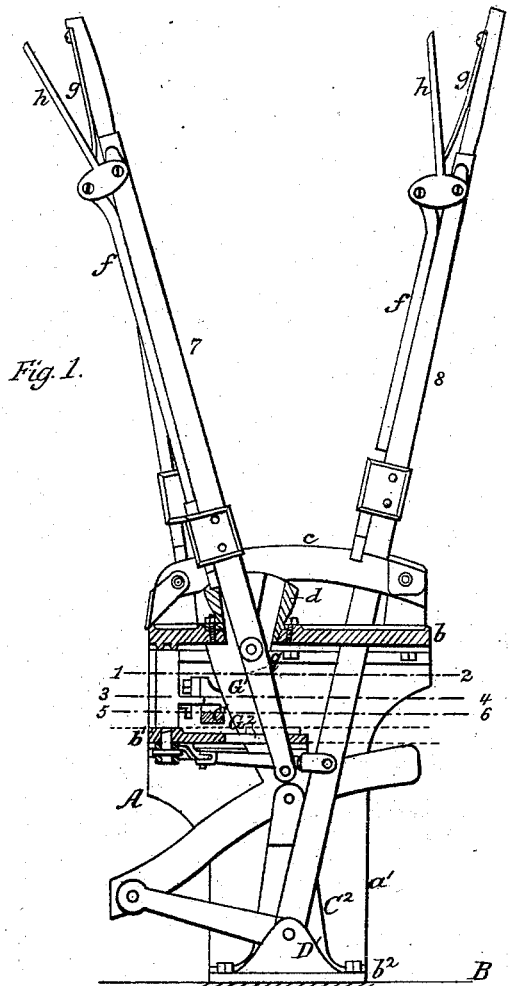
Figure 2:
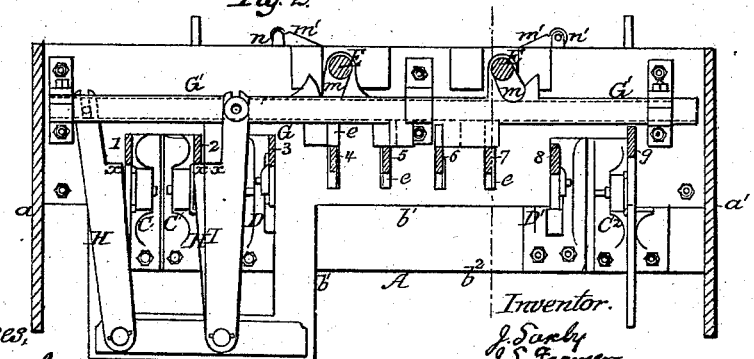

Figure 1, Sheet No. 1, illustrates one form of apparatus which may be used in carrying out our invention; Fig. 2, a sectional plan on the line 1 2, Fig. 1; Fig. 3, Sheet No. 2, a section on the line 3 4, Fig. 1; Fig. 4, a section on the line 5 6, Fig. 1; and Fig. 5, a diagram illustrating the operation of the apparatus; and Fig. 6, Sheet No. 3, a perspective view of a railway-junction, station-house, and signals.

A is a frame, which consists of side pieces $a$ $a^1$ and cross pieces or plates $b$ $b^1$ $b^2$, the latter being bolted to a foundation, B. To the lower cross-piece $b^2$ are secured standards C $C^1$ $C^2$, which are slotted at the upper ends for the reception of the lower ends of levers 1 2 9, hung to pins passing through the standards, and to slotted lugs D D'. Secured to the cross-piece $b^2$, are connected the lower ends of levers 3 and 8, each of the aforesaid levers extending upward through an opening in the plate $b^1$, through a slot in the upper plate $b$, and through a slot in the curved guide $c$, secured to the upper plate. On the upper plate $b$ are slotted lugs $d$ $d$, through which pass levers 4, 5, 6, and 7, each of the said levers being hung to a pin extending through lugs at the under side of the plate $b$, and its lower end projecting through a slot, $e$, in the plate $b^1$. In a suitable guide on each lever slides a bolt, $f$, which is operated by a hand-lever, $h$, and by which the lever is locked in the position to which it may be adjusted in the usual manner. Through guides, near the opposite ends of the plate $b^1$, pass the ends of slides G G', into recesses in which extend arms $m$ $m$ on shafts E E', turning in bearings on the plates $b$ $b^1$, and to arms $m'$ on the shaft are jointed connecting-rods $n$ $n'$, the former being attached to the lever 3 and the latter to the lever 8, as shown in Figs. 3 and 4.

On the inner edge of the slide G are three projections, $o$ $o^1$ $o^2$, and on the slide G are projections $q$ $q'$. To pins projecting from the plate $b^1$, near the inner edge, are hung arms H H' I, the opposite ends of the arms H H' being jointed to the slide G, and the end of the arm I to the slide G', Figs. 2, 3, and 4, and on each arm is a shoulder, $x$.

When the levers are in the position shown in Figs. 3 and 4, the projections on the slides and the shoulders on the arms H H' I will be so situated as to prevent any movement of the levers 2, 5, or 7. When, however, the lever 8 is drawn back to the position shown in Fig. 1, and in dotted lines, Fig. 3, the slide G', through the medium of the rod $n$, shaft E, and its arms, will be carried in the direction of the arrow to the position shown in dotted lines, Fig. 3, so that the lever 7 is released, and the levers 2, 5, and 6 are locked in their positions. In like manner, on drawing back the lever 3, the slide G will be carried to the position shown in dotted lines, Fig. 4, the levers 2 and 5 will be released, and the levers 1, 4, and 7 will be locked in their positions.

In the present instance, the above-described apparatus is shown as arranged within a station-house, P, for operation in connection with the signals and points of a railway-junction of the character illustrated in Fig. 6, in the diagram Fig. 5, in which $1^a$ is the main track up; $2^a$, the main track down; $3^a$, the branch track up; and $4^a$, the branch track down, the arrows indicating the directions in which the trains should move upon the tracks.

The levers 3 and 8, which we term "point"

or "switch" levers are connected to the movable rails of the switches 3′ 8′, the lever 3, by a rod, $u$, to the switch 3′, and the lever 8, by a rod, $y$, to the switch 8′, so that when the lever 3 is in its forward position, and the lever 8 is drawn back to the position shown in Fig. 1, both main tracks will be open for the passage of trains, while by moving forward the lever 8, and drawing back the lever 3, both main tracks will be closed, and the branches will be opened.

The remaining levers 1, 2, 4, 5, 6, 7, and 9 we term "signal-levers," and are connected with signals $s^1$ $s^2$ $s^4$ $s^5$ $s^6$ $s^7$ $s^9$, so that lever 1 will operate the distant signal $s^1$ of the line $1^a$; lever 2 will operate the distant signal $s^2$ of the line $3^a$; lever 4 will operate the station-signal $s^4$ of the line $1^a$; lever 5 will operate the station-signal $s^5$ of the line $3^a$; lever 6 will operate the station-signal $s^6$ of the line $4^a$; lever 7 will operate the station-signal $s^7$ of the line $2^a$; lever 9 will operate the distant signal $s^9$ of the line $2^a$—the signals representing the main up road being colored red; the signals representing the main down road being colored black; the signals representing the branch up road being colored yellow; the signals representing the branch down road being colored blue, a signal when in a vertical position indicating that the road which it represents is open for travel.

It is apparent that trains cannot ply on all the roads indiscriminately; but that if one road is open one or two of the others must be closed. It is the duty of the signals to show which roads are open, and which closed, and of course the switches should be in such a position that while a train may enter one road no other train can, at the same time, enter another road, which should be closed. Thus, when road $1^a$ is open $3^a$ should be closed; when road $2^a$ is open $3^a$ and $4^a$ should be closed; when road $3^a$ is open $1^a$ and $2^a$ should be closed; when road $4^a$ is open $2^a$ should be closed; and the signals are all so connected to the signal-levers that when the lever 3 is forward, and lever 8 back, and both main roads are open, all the signals will be made to indicate this fact by moving the levers 1, 4, 7, and 9 to the positions shown in dotted lines, Fig. 3, and allowing the other levers to remain in their original positions, while by reversing the position of any lever, a signal, the reverse of that first shown, will be displayed.

Now, owing to the peculiar construction of the slides G G′, and of the arms H, H′, and I, and to the manner in which they are connected to the levers, the movement of either of the levers 3 or 8 to close either of the main roads will cause the slide to be so adjusted that all the levers connected to signals already properly displayed are locked in their positions, while the remaining levers may be drawn back to change the character of the signals connected to the same. For instance, after the levers are all moved to their forward positions, as shown in Figs. 3 and 4, the main up road will be open, and the main down closed, Fig. 5. Now, if it is desired to open the main down road, the lever 8 is first drawn back, when the plate G′ will be shifted to the position shown in dotted lines, Fig. 3, thus locking the levers 2 5 6, the signals connected to which are in the proper positions, and unlocking the lever 7, the signals connected to which, as well as those connected to the levers 1, 4, and 9, require to be altered. The attendant now draws back the levers, which are movable, and thus adjusts the signals connected to these levers, so as to indicate the position of the switches.

In like manner, when (after restoring all the levers to their first positions) the lever 3 is drawn back, so as to open the branch up road $3^a$, the plate G will be shifted to the position shown in dotted lines, Fig. 4, when the levers 1, 4, and 7, the signals of which are in their proper positions, will be locked in their places, while the levers 2, 5, and 6, the signals of which must be changed, may be drawn back, as is accordingly done; and it will be seen that after the lever 2 is brought to the position shown in dotted lines, Fig. 3, it will prevent any lateral movement of the arm I or of the plate G′, so that it will be impossible to draw back the lever 8, and move the switch 8′ to a position which would allow trains on the main down line $2^a$ to cross the track of the up branch $3^a$. In like manner, after the lever 8 has been drawn back, so as to open the main down line $2^a$, and to move the slide G to to the position shown in dotted lines, Fig. 3, and after the movable signal-levers have been drawn back, the movement of the lever 3, and consequent improper adjustment of the switch 3′, is prevented by the lever 1 being in such a position as to prevent any movement of the arm H.

It will be seen that after the adjustment of a switch, the switchman is not required to exercise any judgment as to what signals should be displayed, but that his duty simply consists in drawing back such levers as he finds to be movable, when the proper signals cannot fail to be exhibited.

It will be apparent that the number of levers may be increased or diminished, and that they may be differently arranged, as may be required, with junctions of different characters. For instance, the levers may be placed in two or more rows, may be arranged horizontally and radially, or may be hung to vertical or horizontal shafts having arms connected to the signals or switches; and instead of the above-described locking devices a series of arms only, similar to the arms H I, may be used; or perforated or notched plates or slides, so arranged that each lever will be locked unless an arm on the same is opposite an opening in one of the said slides, may be employed.

Various devices may be employed for operating the locking-plates. For instance, the levers may bear against the inclined sides of projections, or the plates or cams may be substituted for the connecting-rods and shafts described.

It will also be seen that, instead of levers, rods or shafts, with hand-wheels on the same, and which may be rotated to effect the change in the positions of the signals or switches, may be used.

Without, therefore, confining ourselves to any particular form or arrangement of levers, or equivalent devices, for operating the switches and signals, or to the use of devices of any particular description for locking the levers in their proper positions,

We claim as our invention and desire to secure by Letters Patent—

A series of levers, and the within-described slides, or their equivalents, combined with the switches and signals of a railway-junction, substantially as set forth, the whole being so arranged and so operating that, after a change in the position of a switch, the levers connected to signals properly displayed to indicate the condition of the road are locked in their positions, while the remaining levers may be adjusted so as to change the positions of the signals or switches which are improperly arranged, all substantially as specified.

In testimony whereof we have signed our names to this specification in the presence of two subscribing witnesses.

JOHN SAXBY.
JOHN STINSON FARMER.

Witnesses:
W. FREDERIC ROGERS,
JOHN RUST.